United States Patent
Andre et al.

(10) Patent No.: US 6,227,512 B1
(45) Date of Patent: May 8, 2001

(54) REMOVABLE BLOCK FOR IMMOBILIZING A VEHICLE WHEEL ON A PERFORATED CARRYING STRUCTURE

(75) Inventors: Jean-Luc Andre, Obernai; Serge Brion, Stutzheim-Offenheim, both of (FR)

(73) Assignee: Lohr Industrie, Hangenbieten (FR)

( * ) Notice: Subject to any disclaimer, the term of this patent is extended or adjusted under 35 U.S.C. 154(b) by 0 days.

(21) Appl. No.: 09/319,345

(22) PCT Filed: Dec. 10, 1997

(86) PCT No.: PCT/FR97/02257

§ 371 Date: Jul. 6, 1999

§ 102(e) Date: Jul. 6, 1999

(87) PCT Pub. No.: WO98/25794

PCT Pub. Date: Jun. 18, 1998

(30) Foreign Application Priority Data

Dec. 11, 1996 (FR) .................................................. 96 15404

(51) Int. Cl.⁷ .................................................. A47B 91/00
(52) U.S. Cl. ........................ 248/346.01; 188/4 R; 188/32; 410/10
(58) Field of Search ...................... 248/346.01, 220.31, 248/220.41, 220.43, 49; 410/10, 30, 20, 9; 188/4 R, 32; 280/293

(56) References Cited

U.S. PATENT DOCUMENTS

| | | | | |
|---|---|---|---|---|
| 4,249,657 | * | 2/1981 | Bates | 206/335 |
| 5,427,210 | * | 6/1995 | Willaford | 188/32 |
| 5,586,849 | * | 12/1996 | Kissel et al. | 410/10 |

* cited by examiner

Primary Examiner—Anita M. King
Assistant Examiner—Gwendolyn Baxter
(74) Attorney, Agent, or Firm—Davis & Bujold, P.L.L.C.

(57) ABSTRACT

The block comprises a body (1) or (30) formed by two lower (9) or (32) and upper (10) or (33) parallel branches spatially offset, mutually joined at one of their ends by an inclined connecting section (11) or (34), the upper branch (10) or (33) extending by a bent portion to form a curved ramp (16) or (49) for lateral guiding towards the central part of the block. The block has at the end opposite to the inclined connecting section (11) or (34) a single locking member for being fixed to the flooring completed by at least a centering and immobilizing structure. This invention is useful for transporting road vehicles on lorries and wagons.

23 Claims, 7 Drawing Sheets

REMOVABLE BLOCK FOR IMMOBILIZING A VEHICLE WHEEL ON A PERFORATED CARRYING STRUCTURE

FIELD OF THE INVENTION

The present invention concerns a removable block for immobilizing the wheel of a road vehicle on a perforated carrying structure.

BACKGROUND OF THE INVENTION

Various types of blocks adaptable to surfaces such as the surface of a truck or railway car for used transporting road vehicles already exist.

One such device is described in French Patent No. 2.725.946 filed by the applicant.

The block described in this patent comprises a locking support base which can be immobilized inside perforations on the carrying surface, and a block structure attached to the support base which pivots between two positions: a flattened position parallel to the carrying surface allowing passage of the vehicles, and an upright position perpendicular to the carrying surface for immobilizing the vehicles. The plate-like support block has two immobilizing claws on its lower surface anchoring it to the carrying surface. Said immobilizing claws, designed to interlock separately within a perforation on the carrying surface, are rotated simultaneously like a rotary lock to alternate between a position for extracting them from the perforations and a locked position, in which the block is immobilized on the carrying surface of the transport vehicle.

Another such block is described in French Patent No. 2,684,054 filed by Officina Meccanica di Migliore Livio. It consists of two cross-pieces transverse to the carrying surface which support the wheel of the vehicle to be immobilized, and two blocking fingers to immobilize it on the carrying surface. One of these fingers pivots between an unlocking position, in which it penetrates or is extracted from a perforation in the carrying surface, and a locking position rotated 90° from the unlocking position, when it is locked in the perforation. The other locking finger is attached opposite the first, separated from it by the same interval that separates two perforations, and it is fixed.

Yet another block is described in European Patent No. 0710,584 in the name of Société Kässbohrer. This block consists of a transverse stop with lateral returns which is a single unit formed from a tubular element. It also comprises two immobilizing fingers to anchor it on the carrying surface, one consisting of a pivoting hook and the other being fixed.

The prior art blocks described briefly above each have at their extremities at least one immobilizing finger or claw anchoring them to the carrying surface. Depending upon the execution, either or both of these claws may pivot between a position which unlocks the block, when they are parallel to the longitudinal axis of an opening in the perforated carrying surface, and a locking position, when they are blocked inside the perforations. This technical solution has been devised to ensure that the block, and thus the vehicle being transported on the carrying surface of the transport means, remains firmly in place.

Nevertheless, the prior art solution of providing two end locking fingers poses several problems.

Positioning and extracting the blocks are difficult operations. In practice, when the block is placed on the carrying surface, each locking finger must be positioned to coincide with the opening of a perforation on the surface. This operation, performed manually, is difficult for the user, as this type of block is very heavy and there is no access to the lock located on the interior of the loading surface, that is, on the surface bearing the vehicle to be transported. On the other hand, when extracting the block, the locking fingers frequently remain locked inside the perforations. Extraction becomes even more difficult when the vehicle wheel is blocked against the stop structure on the block. Furthermore, these prior art blocks are expensive due to high manufacturing costs.

SUMMARY OF THE INVENTION

The goal of the present invention is to eliminate these problems.

To this end, the invention proposes a removable block for immobilizing the wheel of a vehicle on a perforated carrying structure, characterized in that it comprises a locking element at only one extremity anchoring it to the carrying structure, and in that the upper portion extends downward to the fastening base by means of a rounded, angled return defining a concave guide ramp near the central portion of the block.

The advantages of the present invention are as follows:

it facilitates positioning and extraction of the block;

the single locking-unlocking mechanism on the block allows it to be very quickly attached and anchored to the carrying surface, with fewer risks of error and malfunction;

since there is no duplication of the locking-unlocking mechanism, the device is not only lightweight, easily manufactured, and less cumbersome, but also has a shorter body;

the compact shape of the block occupies less surface space, and no portion of it juts out beyond the vertical plane of its upper element;

the block is shorter than blocks currently in use, and therefore:

it is lighter;

it is easier to manipulate and store;

it does not interfere with the suspension system of vehicles which are low to the ground;

the single locking-release mechanism is located outside the vehicle to be transported, eliminating the problem of limited access beneath the vehicle during positioning, locking, and block extraction;

extraction is accomplished without hurting the tire;

the body of the block is formed of a smooth, flattened, U-shaped tube, with the plane defined by its two parallel branches inclined and its projecting surface higher than the locking base;

the tube forming the body of the block has smooth edges which do not damage tires, even when the blocks are aligned along the edge of the supporting surface;

the body of the block is easily shaped by simply curving a tube, and the lateral base can be forged or molded.

BRIEF DESCRIPTION OF THE DRAWINGS

The invention will be more readily understood after reading the following description, based on two modes of execution of the block, and with reference to the accompanying drawings, wherein.

DESCRIPTION OF THE PREFERRED EMBODIMENT(S)

Figure 1:
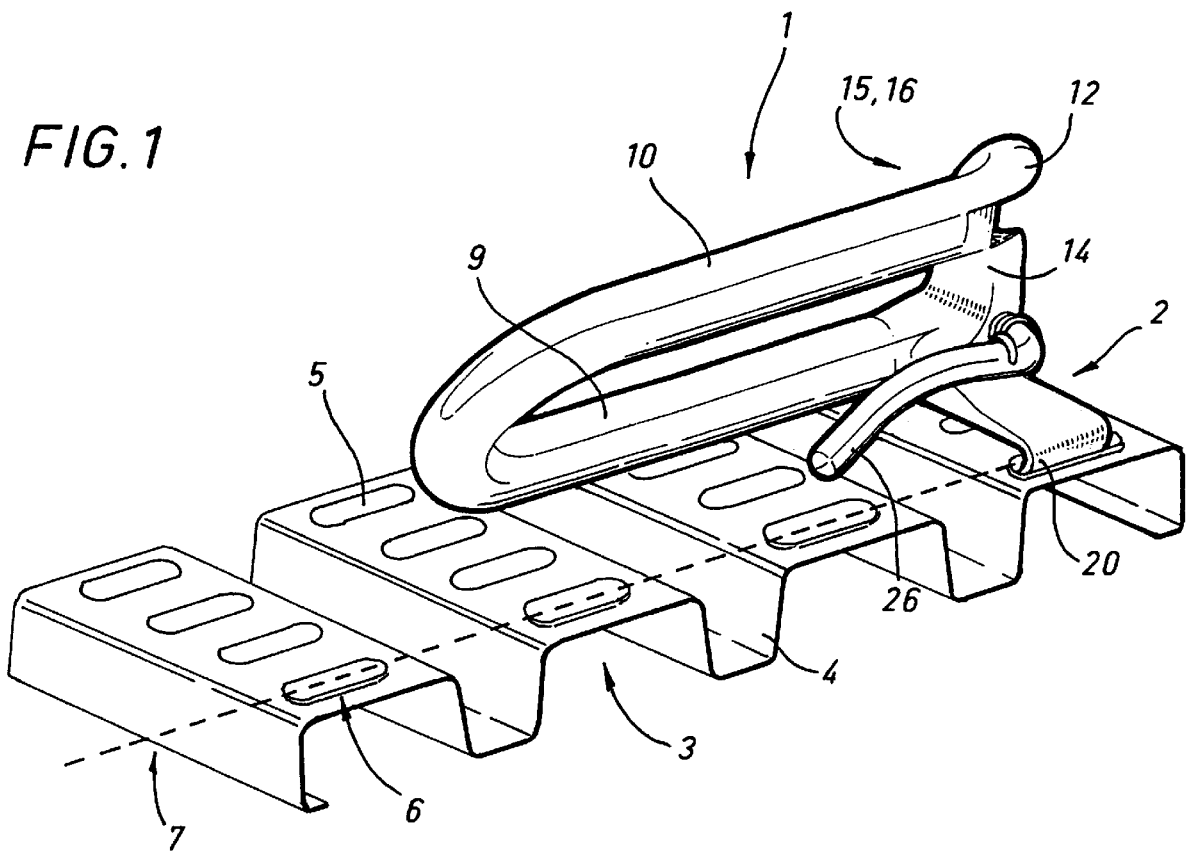
FIG. 1 is a perspective of a first embodiment of the block according to the invention, shown as a single block, attached to a carrying structure with a perforated surface.

The block according to the invention has an elongate transverse body 1 attached to an immobilizing base 2 in order to block and immobilize it; for example, it may be hooked into supporting structure 3, such as a plate with an undulating surface, such as plates 4, with perforations such as oblong perforations 5, and a projecting rim, said perforations being arranged in rows such as row 6 and in lines as in line 7.

The block designed to block the wheel of a vehicle with a tire 8 mounted thereon can be unlocked and then disconnected from the perforated carrying structure 3 by a succession of simple manual maneuvers on a handle or a lever followed by a disengaging movement.

According to one variation, it can be folded into a vertical position to free the previously blocked area immediately in front of the wheel for passage of the wheel. It collapses by pivoting around an axle parallel or perpendicular to the supporting structure until it is either in an upright or flattened position and perpendicular to the surface. The blocks can also be removed or aligned along the support surface in the direction of wheel movement.

Transverse body 1 has a specialized elongated shape with two parallel branches which block tire 8. There is a lower branch 9 and an upper branch 10, spatially offset in the direction of movement and rejoining each other at the unattached end of the block at an inclined connecting portion 11, forming a generally flattened, U-shaped support which may be formed of a single piece by curving a tube or molding it.

Lower branch 9 is located low enough to contact at least one area on the inter-perforated zone. It may be engaged within the space defined by the longitudinal edges opposite the perforations of two successive lines 7.

The inclined plane defined by the two branches is sized and inclined in relation to the block such that its projecting surface essentially covers the surface of the anchor element on the block and completely covers the lock.

This feature allows the block body to serve as a shield protecting the mechanical elements in the block from damage by the tires moving nearby, and likewise, to protect the tires from any projection which could harm them.

Figure 2:
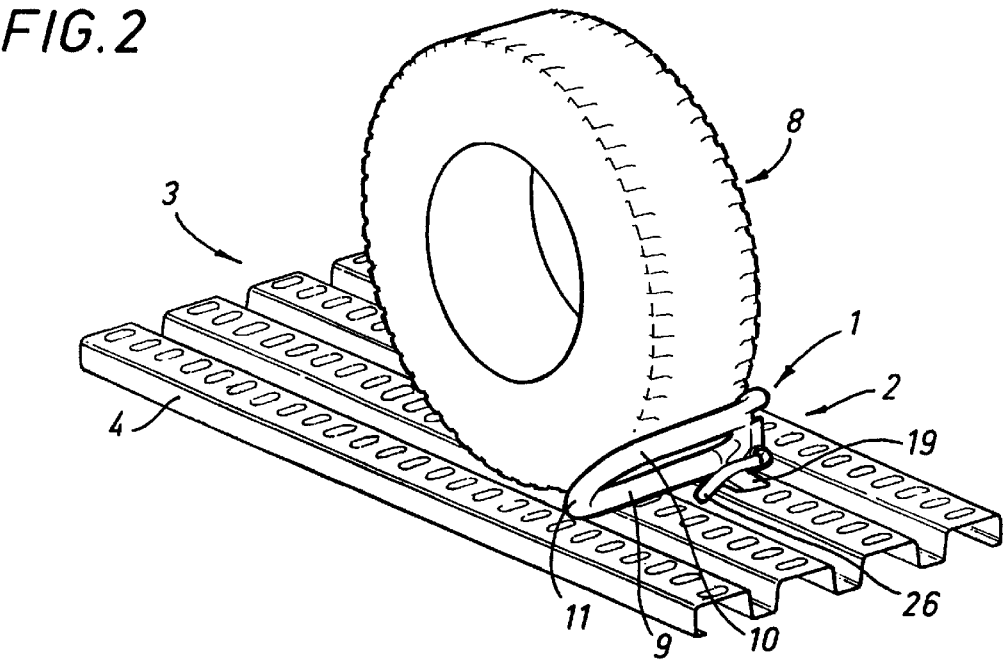
FIG. 2 is a perspective of the first embodiment, shown on a perforated surface immobilizing a wheel.
Figure 3:
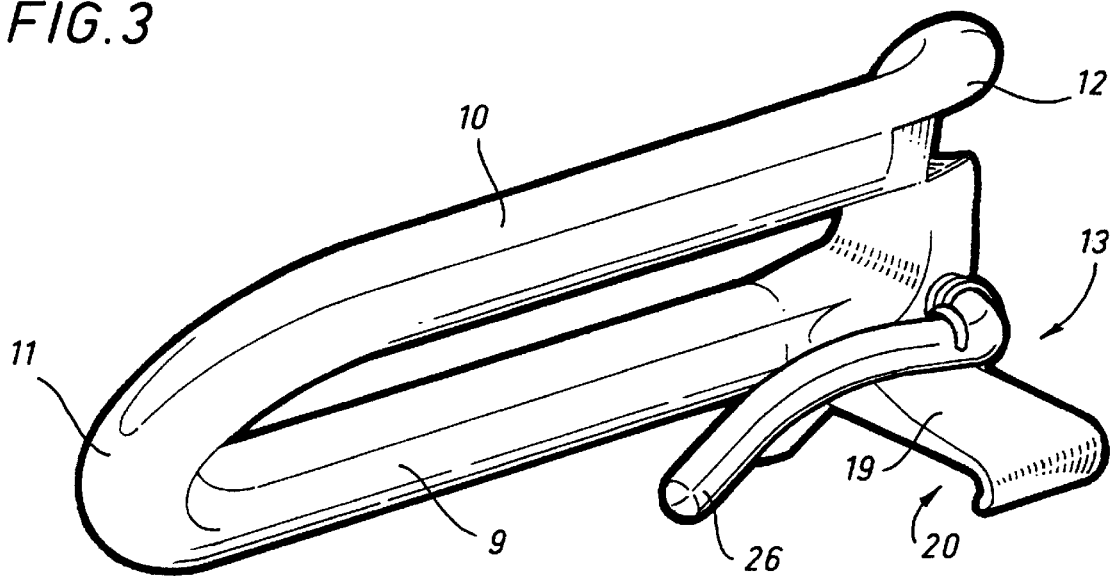
FIG. 3 is a perspective along the diagonal of the front of the block according to the first mode.
Figure 4:
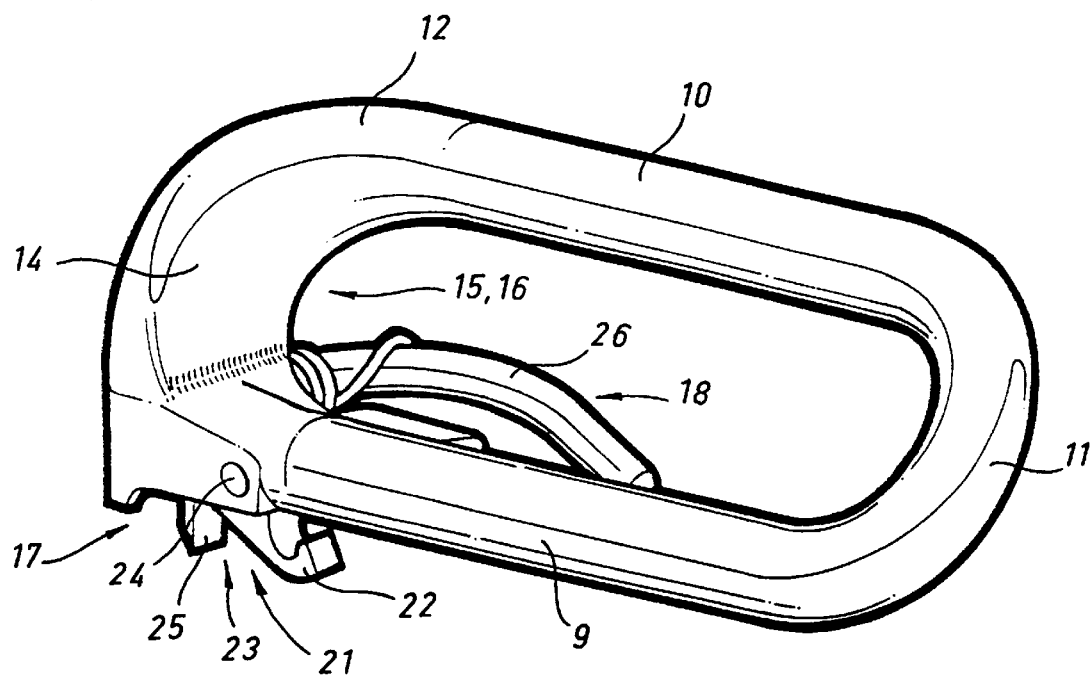
FIG. 4 is a perspective along the diagonal of the rear of the block according to the first mode.
Figure 5:
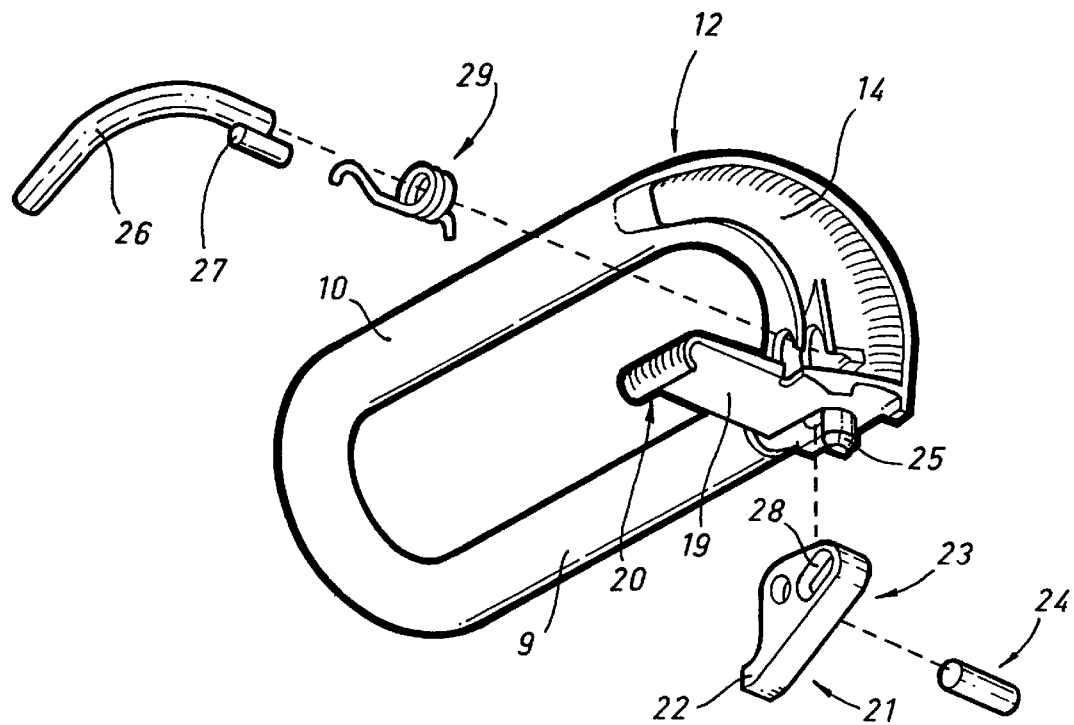
FIG. 5 is a perspective showing an exploded view of the underside of the various lock elements.
Figure 6:
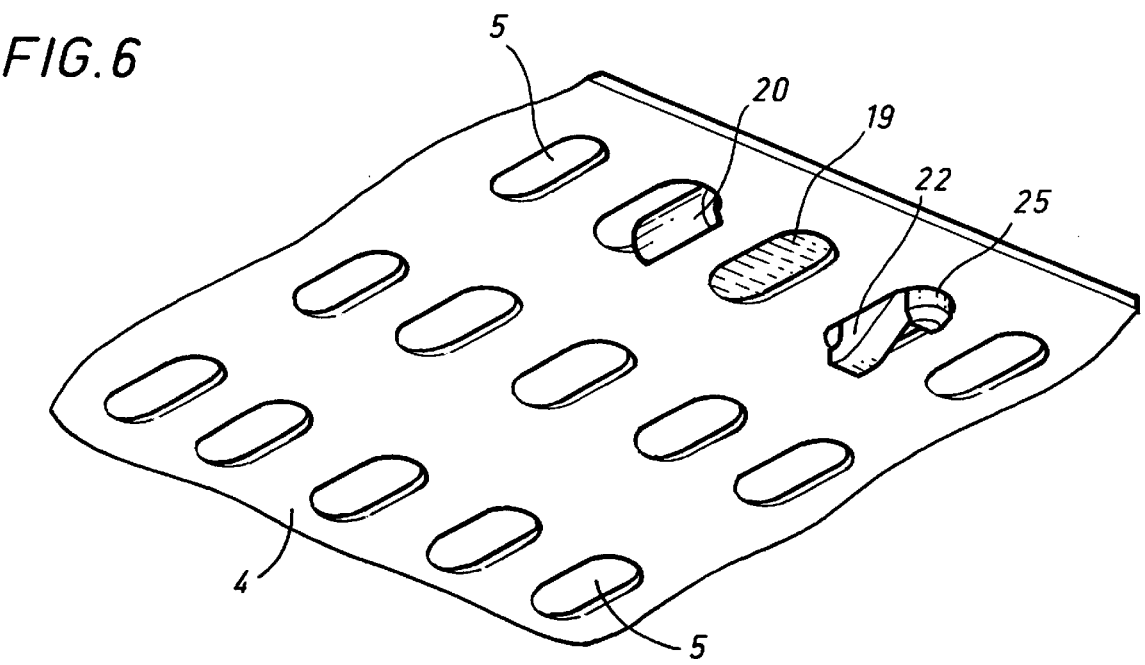
FIG. 6 is a view from beneath the perforated surface showing the claw, the positioning handle, and the locking finger engaged on or inside the perforations.
Figure 7:
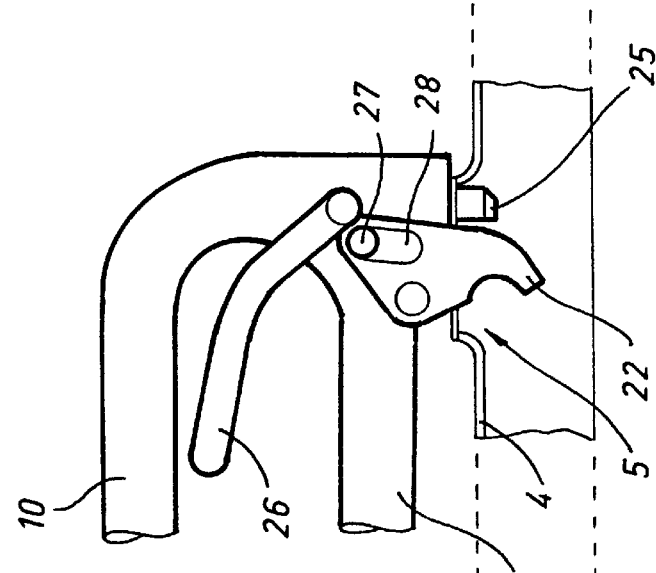
FIGS. 7 and 8 are schematic illustrations of the operation of the locking finger.
Figure 8:
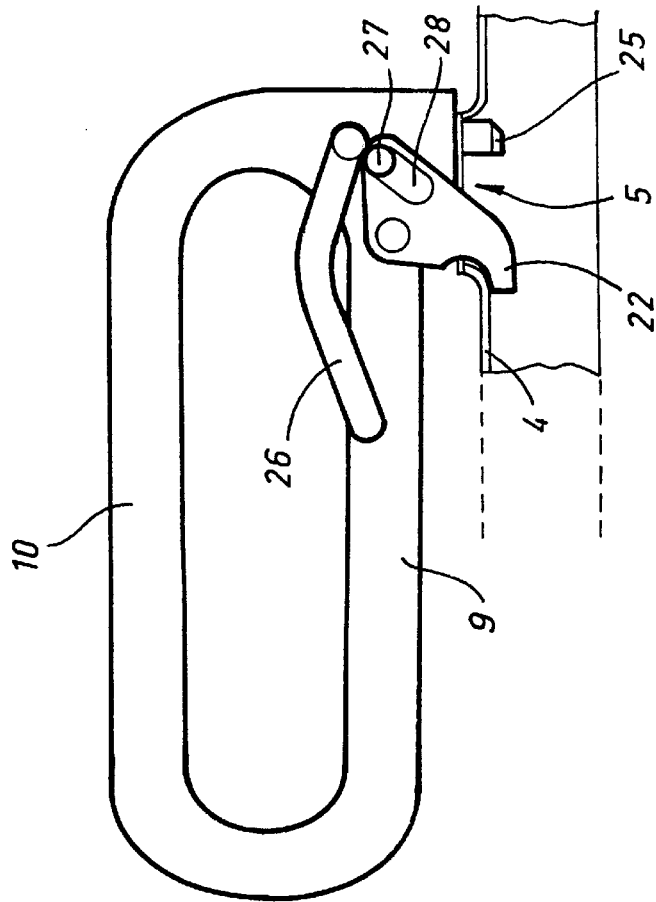
Figure 9:
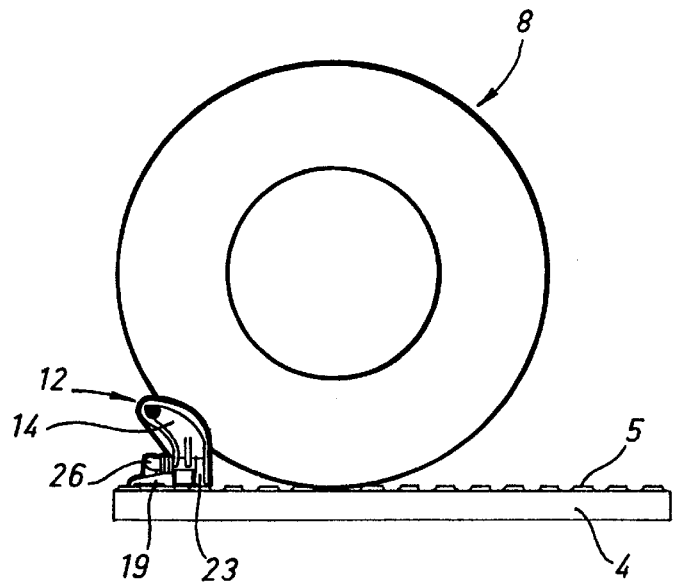
FIG. 9 is a plan view of a wheel contacting the block.
Figure 10:
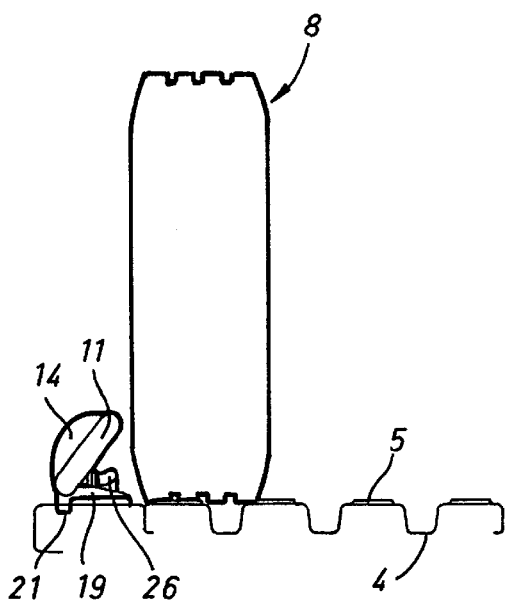
FIGS. 10 and 11 are a profile and a plan view showing the relative configurations of a wheel and a block when positioned.
Figure 11:
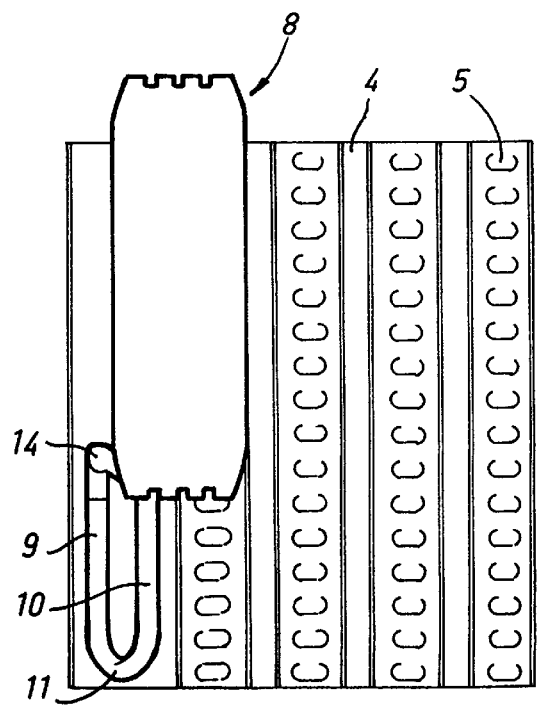
Figure 12:
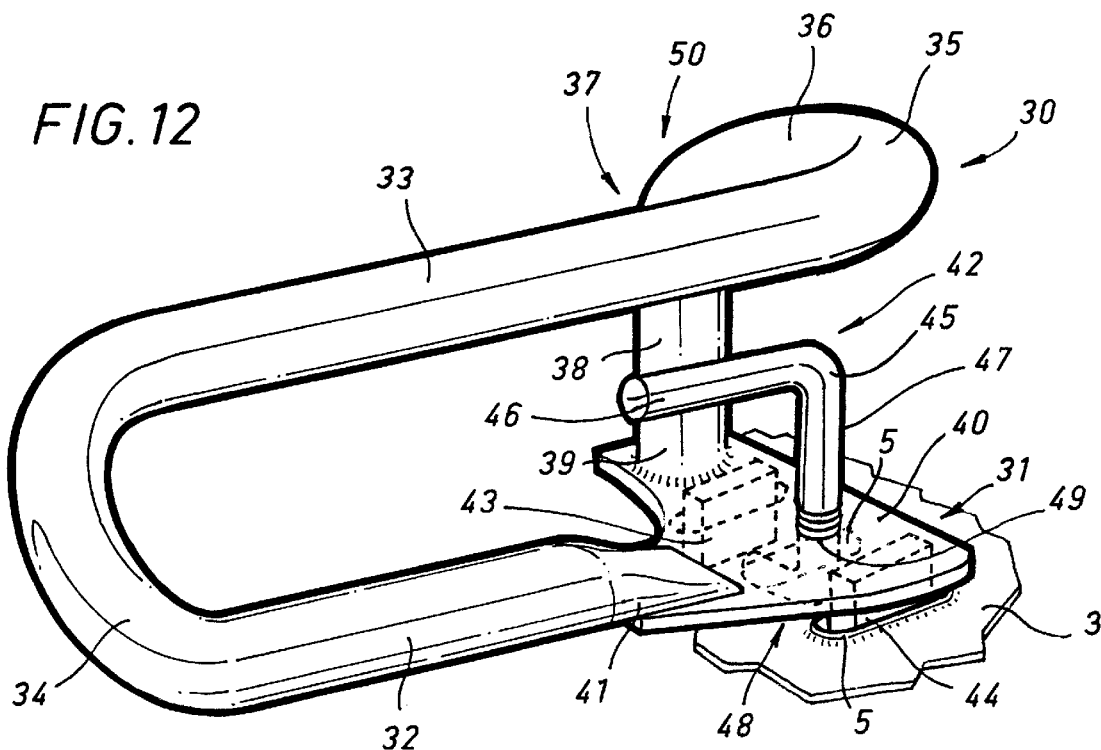
FIGS. 12 and 13 are perspectives along the diagonal of the front and rear, respectively, of the block according to a variation with three immobilizing points.
Figure 13:
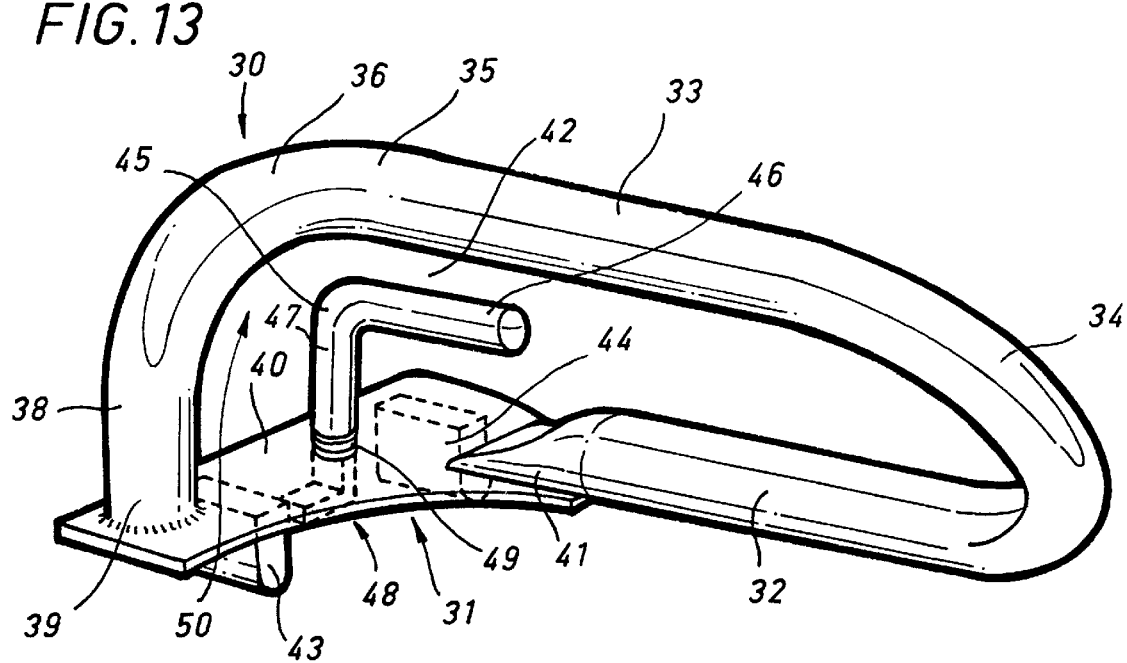
Figure 14:
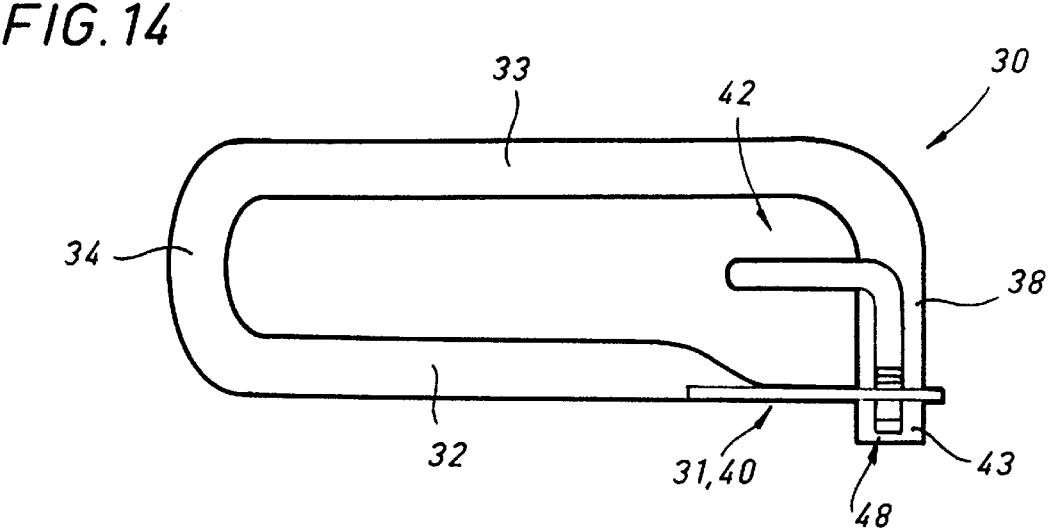
FIG. 14 is a front view of the above block showing the lever for the locking elements.
Figure 15:
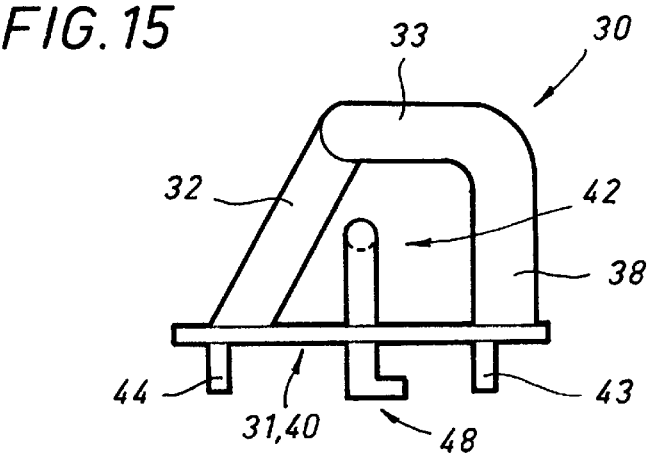
FIG. 15 is a profile view of the above block showing the lever for the locking elements.
Figure 16:
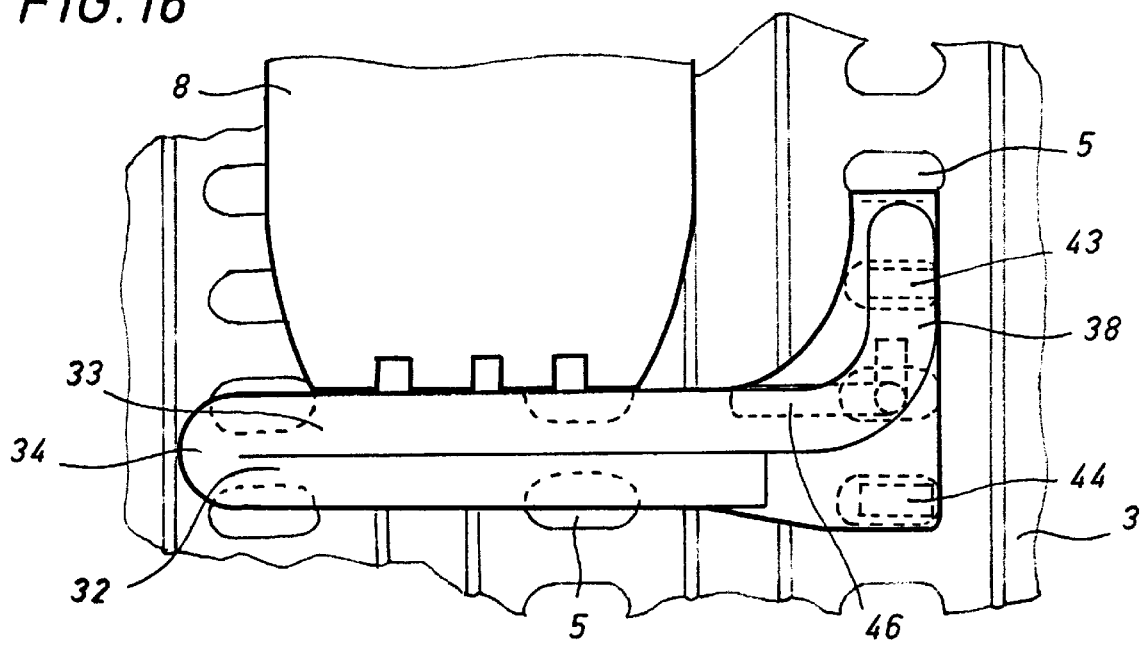
FIG. 16 is a plan view of the block according the variation shown in FIGS. 12 and 13 showing both a portion of the surface to which it is attached and the tire which it immobilizes.

The plane defined by branches 9 and 10 slopes upward toward the front in the direction of tire movement, leaving the lock at the front of the block, as shown in FIG. 2.

At the other end of the block, upper branch 10 extends downward into a rounded angle return element 12. Said rounded angled portion extends as far down as an immobilizing base 13 into a flared, concave connecting element 14 joined to immobilizing base 13 with the end of lower branch 9 joined at the lower level thereof. This configuration defines a hollow guide space 15 extending between immobilizing base 13 and the origin of rounded angle element 12. Hollow guide space 15 becomes progressively more convex, forming an inwardly curved lateral ramp 16 near the central portion of the block.

Convex lateral ramp 16 in guide space 15 guides tire 8 without damaging it toward the central portion of the block to immobilize it in place against at least upper branch 10 in the case of the initial orientation of a tire imperfectly aligned with the block.

Immobilizing base 13 consists of a lock 17 and its manipulating mechanism 18. Lock 17 comprises a plate 19, each longitudinal extremity of which has a claw-like hook engaging within one of the adjacent oblong perforations 5 in the perforated carrying structure 3.

A first claw 20, fixed in relation to plate 19, forms the extension of one of the longitudinal extremities of the plate. It is located on the front portion of plate 19, that is, the portion above the tire. It engages within adjacent perforation 5 or immediately adjacent thereto when carrying structure 3 moves longitudinally, but transversely in relation to lines 7 of perforations 5, on the long side closest to the edge of the adjacent perforation. This fixed claw 20 constitutes the lock's fixed hooking means.

Said first claw 20 is located near the projection of upper branch 10.

A second claw 21 is finger-shaped with a hooked extremity 22 formed in a locking segment 23. This is a movable segment which rotates around a transverse pin-axle 24 at the level of the opposite longitudinal extremity of hooking plate 19. This movable locking finger 21 pivots to fasten in a direction parallel to lines of perforation 7, that is, crosswise in relation to the fastening direction of first fixed claw 20.

Locking finger 21 is completed by a protruding positioning element 25 attached perpendicular to fastening plate 19 and designed to engage within the perforation used by locking finger 21 to achieve primary immobilization or centering. Locking will complete this immobilization. To accomplish this, fixed positioning element 25 is located at the appropriate distance from the perforation used by the fixed claw.

Rotating locking finger 21 is actuated by a pivot mechanism extending into a lever, forming handle 26.

This actuating mechanism comprises handle 26, which is attached to a pivot axis supporting or actuating an axle tip 27 parallel to its pivot axis and cooperating with a groove which serves as a cam 28 formed in the upper portion of element 23 of the locking finger.

Thus, lowering the handle causes locking finger 21 to rotate and engage the locking mechanism for the block. Said locking finger 21, which is a rocker element, then becomes flattened against the lower surface of the perforated plate near adjacent perforation 5, and actually grips it. Together with the longitudinal hooking action of fixed claw 20 and positioning handle 25, this forms a complete, highly resistant lock.

A torsion spring 29 on the axle of the actuator mechanism maintains the locked position.

This lock is effective enough to eliminate the need for a second lock, which would ordinarily be located below the opposite extremity of the block, as with prior art blocks.

Transverse immobilizing body 1 is long enough to receive the largest tires in a category of vehicles, such as, for example, passenger cars. This characteristic means that the block is as short as possible. For vehicles in the same category with either very small or exceptionally large wheels, it is merely necessary to move the block one or two intervals along the perforated plate.

The variation using three immobilizing points shown in FIGS. 12 through 16 is distinguished from the above variation by the following general characteristics.

The fixation plate extends farther in the direction of tire movement, the lower branch of the transverse body of the block is positioned in front of the tire to be locked, and it is attached to the plate using a lock, for example a central lock, of the type which rotates a quarter-turn, completed by two centering-immobilizing elements.

This variation comprises the same general elements as the variation previously described.

It includes an elongate transverse body 30 attached to an immobilizing base 31 extending longitudinally for attachment to supporting structure 3 forming a surface plate consisting, for example, of plates 4 with oblong perforations 5 and a projecting rim, said perforations arranged in rows such as row 6 and in lines such as line 7.

The block which stops the wheel with vehicle tire 8 mounted thereon can be unlocked and then disconnected from perforated carrying surface 3 by performing a simple manual maneuver on the handle or lever and then disconnecting the block.

According to a variation, the block body can be folded into a vertical, disengaging position perpendicular to the plate surface, or removed and positioned along the plate surface parallel to the direction of movement.

Transverse block body 30 has a specialized elongated shape. It is formed of two parallel branches, with tire 8 being blocked against one branch. There is a lower branch 32 and an upper branch 33, spatially offset and rejoined at the unattached end of the block by a sloping connecting element 34. The entire unit forms a generally flattened, U-shaped support which can be made in one piece by bending a tube, forging or molding.

The free end of upper branch 33 extends toward the back in an angled section 35 followed by a segment 36 which, together with upper branch 33, forms a guide space 37 for tire 8. Segment 36 has an angled extremity and extends downward into a segment 38. The free end 39 of segment 38 is integral with a fixation plate 40 which, together with the centering-immobilizing means, forms immobilizing base 31.

Unattached extremity 41 of lower branch 32 is closed and connected to the other extremity of fastening plate 40, which constitutes the mechanical connection between the two other extremities of lower branch 32 and upper branch 33.

Fixation plate 40 is longer than in the version shown in FIGS. 1 through 11. It has an element, such as a central locking element 42, separating two centering-immobilizing structures in the form of two blocks 43 and 44 designed to penetrate two openings in the plate.

Blocks 43 and 44 may be approximately the same shape and size as the plate openings or slightly smaller than the openings to ensure complementary immobilization, or they may be of a different shape and size in order to form simple centering-immobilizing guides to effect primary immobilization of the block.

More generally speaking, lock 42 can be located anywhere in relation to two centering-immobilizing structures, for example, at one or the other end of the perforations covered by fixation plate 40.

Moreover, one of the centering-immobilizing structures can be integrated with lock 42, with the other one distinct, either inside an adjacent perforation or immediately adjacent thereto.

Lock 42, which may be a central lock, has an angled manipulating lever 45 with a horizontal upper branch 46 and an upright branch 47. It is attached to fixation plate 40, where it pivots. Upright branch 47 traverses plate 40 and extends downward into an angled portion with supporting foot 48 perpendicular to horizontal upper branch 46. The unit is flexibly attached at the top by a compression spring 49 extending between two stops around the lower extremity of upright branch 47. The purpose of this spring is to hold foot 48 in place against the lower surface of the plate near the opening traversed by the lock.

The plane defined by the two, lower branch 32 and upper branch 33 of transverse body 31 slopes down toward the front in the direction from which tire 8 approaches, leaving upper branch 33 of lock handle 42 covered, in the closed position, and approximately underneath upper branch 33.

Segment 36 and the first portion of upper branch 33 define guide space 37 forming a concave, curved, lateral ramp 50 which guides tire 8, without forcing it, toward the central portion of the block to place it in immobilizing contact with upper branch 33 if its initial orientation is not perfectly aligned with the block.

This variation imparts more stability to the block, as fixation plate 40 extends farther in the longitudinal direction.

What is claimed is:

1. A removable block for immobilizing a tire (8) of a vehicle wheel on a supporting structure (3) having a plurality of perforations (5) thereon, the block having a transverse body extending, transversely to a direction of movement of the immobilized tire (8), during use and the block being immobilized via at least one of the perforations of the supporting structure (3);

wherein the transverse body (1 or 30) of the block comprises a lower branch (9 or 32) and an upper branch (10 or 33), the lower branch (9 or 32) extends parallel to the upper branch (10 or 33) but is spatially offset from the upper branch (10 or 33), first ends of the lower branch (9 or 32) and the upper branch (10 or 33) are joined to one another by an inclined connection section (11 or 34), and opposed second ends of the lower branch (9 or 32) and the upper branch (10 or 33) of the body (1 or 30) are connected to an immobilizing base (13 or 31) comprising a locking mechanism for removably attaching the block to the supporting structure (3) via at least one of the perforations of the supporting structure (3); the upper branch (10 or 33) extends toward the immobilizing base (13 or 31) and includes an angled portion (12, 35), and said locking mechanism comprises at least one centering-immobilizing element for engagement with at least one of the perforations.

2. The block according to claim 1, wherein the body (1 or 30) is a tubular.

3. The block according to claim 1, wherein the connection section (11 or 14), which provides the spatially offset between the upper and lower branches (32 and 33) of the body (30) of the block is spaced from the tire when immobilizing the tire (8).

4. The block according to claim 1, wherein the angled portion (35) includes a curved segment (36) which forms, with the upper branch (33), a guide space (37) for the tire (8), the curved segment (36) is connected to a perpendicular segment (38) which is integral with a fastening plate (40), and the fastening plate (40) together with the locking mechanism and the at least one centering-immobilizing element, form the immobilizing base (13 or 31); and the second end (41) of the lower branch (32) is integral with the fastening plate (40).

5. The block according to claim 1, wherein the locking mechanism is a turning lock (42), and a lower extremity of the turning lock (42) is positioned to lock transversely in relation to an adjacent perforation located below the immobilizing base (13 or 31).

6. The block according to claim 5, wherein the turning lock (42) comprises an angled lever which includes an upright branch (47) and an upper branch (46) angled with respect to the upright branch (47), the upright branch (47) extends perpendicular to the immobilizing base (13 or 31) and a remote end of the upright branch (47) supports a foot (48) located to contact a lower surface of one of the perforations of the supporting structure (3) for removable attaching the block to the supporting structure (3).

7. The block according to claim 6, wherein when the lock mechanism (42) is in a locked position, the upper branch (46) of the lock mechanism (42) extends parallel to and is partially protected by the upper branch (33).

8. The block according to claim 5, wherein two centering-immobilizing elements are integral with the immobilizing base (13 or 31), each one of the centering-immobilizing elements is a block (43 and 44) which has a shape sized to fit into one of the perforations of the supporting structure (3).

9. The block according to claim 1, wherein the locking mechanism (42) is located between two centering-immobilizing elements which are integral with the immobilizing base (13 or 31), and each of the two centering-immobilizing elements is located to engage with an adjacent perforation of the supporting structure (3) for removable attaching the block to the supporting structure (3).

10. The block according to claim 9, wherein the two centering-immobilizing elements are blocks (43 and 44) which have a shape different from a shape of the perforations of the supporting structure (3) so that the two centering-immobilizing elements form a centering-immobilizing guide facilitating immobilization of the block.

11. The block according to claim 1, wherein the locking mechanism (42) and two centering-immobilizing elements are all integral with the immobilizing base (13 or 31), and the locking mechanism (42) and the two centering-immobilizing elements are each located to engage with an adjacent perforation of the supporting structure (3) for removable attaching the block to the supporting structure (3).

12. The block according to claim 1, wherein two centering-immobilizing elements are integral with the immobilizing base (13 or 31), one of the centering immobilizing elements is located adjacent the lock mechanism (42), while the other centering immobilizing elements is spaced from the lock mechanism (42).

13. The block according to claim 1, wherein two centering-immobilizing elements are integral with the immobilizing base (13 or 31), each one of the centering-immobilizing elements engage with the perforation located adjacent the lock mechanism (42).

14. The block according to claim 1, wherein the connection section (11), which provides the spatially offset between the upper and lower branches (9 and 10) of the body (1) of the block is spaced from the tire when immobilizing the tire (8).

15. The block according to claim 1, wherein the angled portion is an angled return (12) which has a rounded shape.

16. The block according to claim 1, wherein the second end of the upper branch (10) is connected to a rounded, angled return (12), and a concave connecting zone (14) joins the angled return (12) to the immobilizing base (13), said concave connecting zone (14) defines a concave curved ramp (16) which forms a guide for biasing the tire (8) toward a central region of the block.

17. The block according to claim 16, wherein the lower branches (9) and the upper branches (10) are interconnected to form a U-shaped piece defining an inclined plane.

18. The block according to claim 1, wherein a fixed claw (20) is located at one end of the immobilizing base (13) for engagement with one of the perforations of the supporting structure (3), a rotatable locking finger (21) with a protruding fixed positioning element (25) is connected to an opposed extremity of the immobilizing base (13), the rotatable locking finger (21) and the protruding fixed positioning element (25) cooperate with another to provide lateral and longitudinal immobilization of the block once the locking mechanism is engaged.

19. The block according to claim 18, wherein the fixed claw (2) and the rotatable locking finger (21) both fasten in directions which are perpendicular to one another.

20. The block according to claim 18, wherein the fixed claw (20) fastens in a longitudinal direction of the supporting structure (3) while the locking finger (21) fastens in a transverse direction of the supporting structure (3).

21. The block according to claim 18, wherein the fixed claw (20) is located adjacent a projection of the upper branch (10).

22. The block according to claim 1, wherein the transverse immobilizing body (1 or 30) pivots on the immobilizing base (13 or (1) so that the immobilizing body (1 or 30) can be moved into an upright position perpendicular to a plane defined by the supporting structure (3).

23. The block according to claim 1, wherein the transverse immobilizing body (1 or 30) pivots on the immobilizing base (13 or (1) so that the immobilizing body (1 or 30) can be removed and arranged in a row parallel to the direction of movement along a plane defined by the supporting structure (3).

* * * * *